(12) United States Patent
Kim

(10) Patent No.: US 7,945,272 B2
(45) Date of Patent: May 17, 2011

(54) GROUP COMMUNICATION SERVICE METHOD, MOBILE TERMINAL USING THE SAME, AND GROUP COMMUNICATION SERVICE SYSTEM THEREOF

(75) Inventor: Sung Chul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 559 days.

(21) Appl. No.: 11/221,462

(22) Filed: Sep. 7, 2005

(65) Prior Publication Data

US 2006/0063548 A1 Mar. 23, 2006

(30) Foreign Application Priority Data

Sep. 8, 2004 (KR) ...................... 10-2004-0071763

(51) Int. Cl.
*H04W 24/00* (2009.01)
*H04B 7/00* (2006.01)
*H04B 1/38* (2006.01)

(52) U.S. Cl. ................. 455/456.2; 455/456.1; 455/518; 455/519; 455/566

(58) Field of Classification Search ... 455/456.1–456.6, 455/518, 519, 566
See application file for complete search history.

(56) References Cited

U.S. PATENT DOCUMENTS

| | | | |
|---|---|---|---|
| 6,005,848 A * | 12/1999 | Grube et al. | 370/266 |
| 6,240,069 B1 * | 5/2001 | Alperovich et al. | 370/260 |
| 6,441,752 B1 * | 8/2002 | Fomukong | 340/988 |
| 6,477,387 B1 * | 11/2002 | Jackson et al. | 455/519 |
| 6,587,691 B1 * | 7/2003 | Granstam et al. | 455/456.1 |
| 6,968,179 B1 * | 11/2005 | De Vries | 455/414.1 |
| 2002/0086659 A1 | 7/2002 | Lauper | |
| 2003/0013456 A1 * | 1/2003 | Bates et al. | 455/456 |
| 2003/0119540 A1 * | 6/2003 | Mathis | 455/518 |
| 2004/0058698 A1 | 3/2004 | Crockett | |
| 2004/0266468 A1 * | 12/2004 | Brown et al. | 455/518 |
| 2005/0113123 A1 * | 5/2005 | Torvinen | 455/519 |
| 2005/0176454 A1 * | 8/2005 | Chakraborty et al. | 455/518 |

(Continued)

FOREIGN PATENT DOCUMENTS

JP 09-146442 6/1997

(Continued)

OTHER PUBLICATIONS

Durr F et al: "On a Location Model for Fine-Grained Geocast" Proceedings of the International Conference on Ubiquitous Computing, XX, XX, Oct. 12, 2003, XP002338360.

*Primary Examiner* — Ariel Balaoing
(74) *Attorney, Agent, or Firm* — Lee, Hong, Degerman, Kang & Waimey

(57) ABSTRACT

A method of performing a group communication service with respect to a plurality of pushto service subscribers using mobile terminal location information is provided. The method includes acquiring location information of each of the plurality of pushto service subscribers, the location information indicating a current location of at least one of the plurality of pushto service subscribers with respect to a specific area; generating group member list information corresponding to the plurality of pushto service subscribers and including a member list in which the current location of the at least one of the plurality of pushto service subscribers is classified with respect to the specific area; and displaying the group member list information including a list of the group members within the specific area.

33 Claims, 4 Drawing Sheets

U.S. PATENT DOCUMENTS

2006/0073839 A1 * 4/2006 Gorday et al. ........... 455/456.2

FOREIGN PATENT DOCUMENTS

| | | |
|---|---|---|
| JP | 2001-160858 | 6/2001 |
| JP | 2001-346267 | 12/2001 |
| JP | 2004-192297 | 7/2004 |
| JP | 2004-198245 | 7/2004 |
| KR | 10-2005-0107205 | 11/2005 |
| KR | 10-2005-0119570 | 12/2005 |
| WO | WO 99/66757 | 12/1999 |
| WO | WO 99/66757 A | 12/1999 |
| WO | WO 01/93529 A | 12/2001 |
| WO | WO 2004/012421 | 2/2004 |
| WO | 2004/030398 | 4/2004 |
| WO | WO 2004/028113 | 4/2004 |

* cited by examiner

GROUP COMMUNICATION SERVICE METHOD, MOBILE TERMINAL USING THE SAME, AND GROUP COMMUNICATION SERVICE SYSTEM THEREOF

This application claims the benefit of Korean Patent Application No. 10-2004-0071763, filed on Sep. 8, 2004, which is hereby incorporated by reference as if fully set forth herein.

BACKGROUND OF THE INVENTION

1. Field of the Invention

The present invention relates to a group communication method using location information of a mobile terminal, and more particularly, to a method of group communication and mobile terminal thereof. Although the present invention is suitable for a wide scope of applications, it is particularly suitable for performing group communication functions with communication counterparts (other members of the group) with respect to a specific area by grouping the communication counterparts according to locations using acquired location information.

2. Discussion of the Related Art

Pushto service (also known as PT service) includes push-to-talk services for voice (audio) data transmission, push-to-view services for moving picture (video) transmission, and push-to-data services for other types (e.g., text) of data transmission. Such services implement a trunked radio system, which employs a half-duplex system in a mobile terminal to approximate the operation of a walkie-talkie, to enable one client (mobile terminal user) to transmit media data (e.g., "talk" bursts) while establishing a session with at least one other client, i.e., another member of an established group of mobile terminal operators, using a session initiation protocol. Pushto service allows communication with one recipient (one-to-one communication) or communication among a plurality of recipients (one-to-many communication) such as a group "chat" session. Thus, pushto service is a facilitating communication service between a mobile communication network user and a service provider by allowing faster connections and conserving bandwidth resources.

A mobile terminal equipped with a pushto service function as described above periodically updates current information of a contact (group member) list, which is recorded by the mobile terminal itself as a "group," and enables a group communication function (e.g., a pushto service such as a push-to-talk function) with a specific communication counterpart or with the group. By recording the members of the group in the mobile terminal, the member list can be organized and referenced as a conventional phonebook feature. Current counterpart status information can be displayed via suitable set of icons or text and may include an indication of group member communication enablement, i.e., on line or off line ("idle"), the presence or absence of a busy line (busy signal), individual connection states, and terminal status within the group. Known mobile terminals enabling pushto service, however, have no capability to display information of a current location of a communication counterpart.

SUMMARY OF THE INVENTION

Accordingly, the present invention is directed to a method of group communication service, mobile terminal using the same, and a group communication service system thereof that substantially obviate one or more problems due to limitations and disadvantages of the related art.

An object of the present invention is to provide a group communication service method, which enables selective group communication functions with group communication counterparts located inside or outside a specific area.

Another object of the present invention is to provide a group communication service method, which allows an enhancement of a user's communication efficiency by enabling a display of a counterpart's specific area.

Another object of the present invention is to provide a group communication service method, by which radio resources can be conserved by enabling a reduction in unnecessary communications.

Another object of the present invention is to provide a mobile terminal suitable for using the above group communication service methods.

Another object of the present invention is to provide a group communication service system suitable for implementing the above mobile terminal and group communication service methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of performing a group communication service with respect to a plurality of pushto service subscribers using mobile terminal location information. The method comprises acquiring location information of each of the plurality of pushto service subscribers, the location information indicating a current location of at least one of the plurality of pushto service subscribers with respect to a specific area; and generating group member list information corresponding to the plurality of pushto service subscribers and including a member list in which the current location of the at least one of the plurality of pushto service subscribers is classified with respect to the specific area.

In another aspect of the present invention, there is provided a mobile terminal comprising a transceiver for receiving location information of a plurality of pushto service subscribers, the location information indicating a current location of at least one of the plurality of pushto service subscribers with respect to a specific area, and for performing a specific group communication function with respect to each of the plurality of pushto service subscribers; and a controller for generating and outputting, based on the received location information, group member list information corresponding to the plurality of pushto service subscribers and including a member list in which the current location of the at least one of the plurality of pushto service subscribers is classified with respect to the specific area.

In another aspect of the present invention, there is provided a group communication service system employing a location based service function. The group communication service system comprises a location information provider for determining locations of each of a plurality of mobile terminals and for registering a plurality of pushto service subscribers; and a terminal for performing a specific group communication function according to a user selection command, by continuously exchanging status information with a network and by being provided with location information of the plurality of pushto service subscribers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, like reference designations will be used throughout the drawings to refer to the same or similar parts.

Figure 1:
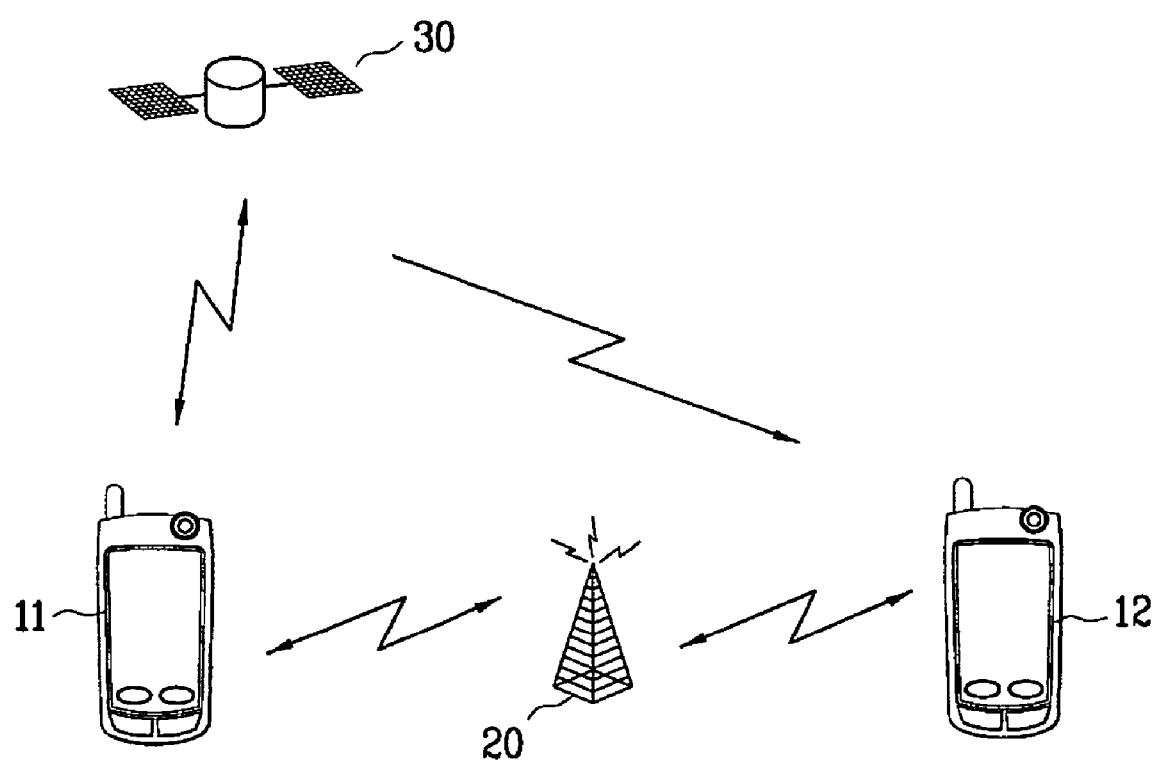
FIG. 1 is a diagram of elements for performing unidirectional voice communication employing a location information based service function according to the present invention.

FIG. 1 shows the basic elements for performing unidirectional voice communication employing a location-information-based service (LBS) function according to the present invention as part of a group communication service system. Thus, a subscriber's location can be provided via a presence service (messenger function), which may integrate a location-based service or global positioning service. That is, the present invention is applicable to a pushto service based on current location information of each of a plurality of mobile communication terminals 11 and 12. A system according to the present invention includes a satellite 30 for determining the current locations of the mobile terminals 11 and 12 and a communication network 20 for performing information exchanges among the mobile terminals.

For example, a voice communication system (push-to-talk) can be implemented according to the present invention using a location-based service, which uses location detection technology to detect a user's location any time the user's mobile terminal is powered on and may provide additional applications (information services) associated with the detected location. Such location-based services determine the location of the user's mobile terminal using a mobile communication network, a satellite signal, and the like, through the application of a system configuration integrating mobile communication network technology, position tracking technology, mobile terminal technology, and information technology. The location-based service can inform the user of any mobile terminal's location, including that of specific counterpart (group member). Thus, in providing the location-based service, each service provider may implement a unique service method, and the precision of the location-based service (for example, to within a zone of several square meters) differs according to the system, which may use a global positioning system module or the PN code of a base station. A location-based service therefore may, according to a user request for location information, perform two important functions, namely, an acquisition of user's location and a utilization of the location information to provide a service, to thereby detect the location of a user, instrument, terminal vehicle, or the like.

Figure 2:
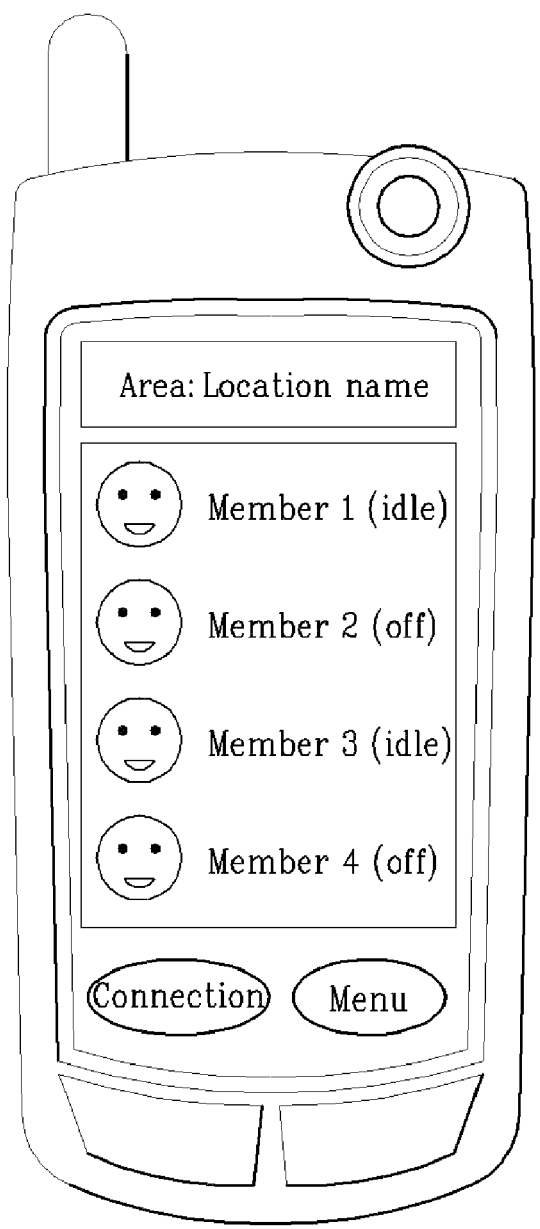
FIG. 2 is a layout of an exemplary screen of a mobile terminal according to the present invention.
Figure 3:
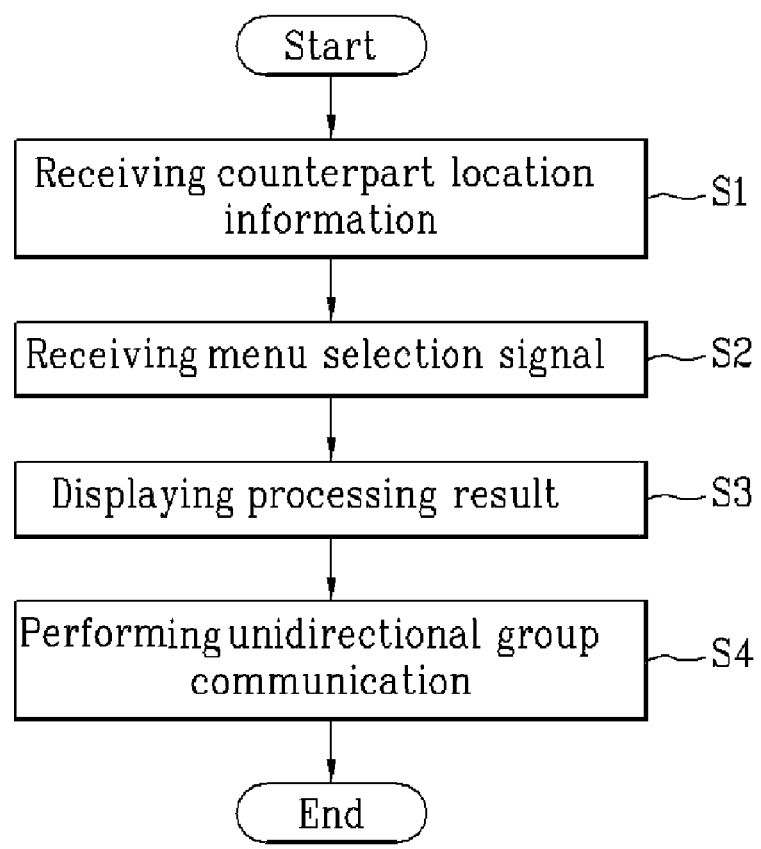
FIG. 3 is a flowchart of a process of a unidirectional voice communication employing a location information based service function according to the present invention.

FIG. 2 illustrates an example of an application of the present invention in the form of a pushto-service-enabled mobile terminal used in conjunction with the above-configured system, to display a member list (e.g., members 1-4) associated with a specific area (zone or location name). For example, if a user designates a specific area, a set of target information (contact list) accessible to the user's mobile terminal appears for the area designated. FIG. 3 illustrates a method for employing the location-based service function to perform, using the mobile terminal of FIG. 2, a unidirectional voice communication employing a location information based service function according to the present invention.

Referring to FIG. 3, with the pushto-service-enabled mobile terminal being turned on (powered), the user can be provided with current location information, secured through the location-based service, as well as current information of the contact list registered to Web. The information is periodically updated by, for example, a refresh operation (S1).

The user inputs various commands using a menu function of the mobile terminal. In doing so, a mobile terminal requesting a group communication function is displayed as an "inviter" terminal, and a mobile terminal having authority to establish group communication is displayed as a master (S2).

The user can view the location information by selecting a target (member) on the contact list and can also perform sorting according to the location information using an optional pop-up menu. For instance, various menus may provide means for grouping group members according to a specific area, sorting group members according to a specific area, grouping members according to a specific area defined by the user, grouping members according to a specific area determined with respect to a member selected by the user, and grouping members according to a specific area determined with respect to the user. The specific area may be selectively defined as a predetermined distance from the user, from another group member, or from another known location, e.g., a reference location such as that of the inviter terminal or the master terminal. Typically, the specific area would correspond to a circular area within a predetermined distance from the reference location, the predetermined distance being set by a user, a mobile terminal, or the mobile communications system. The mobile terminal then displays the group communication information according to the above menu selection and the received location information of the active counterparts of the group (S3).

Thereafter, the user performs a unidirectional voice communication on at least one of a plurality of targets on the list (S4).

Figure 4:
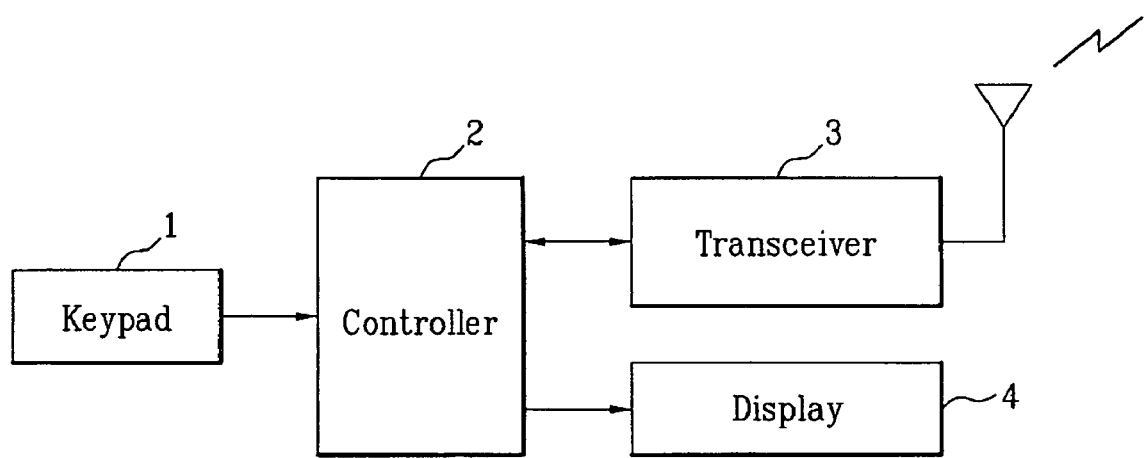
FIG. 4 is a block diagram of a mobile terminal for performing a pushto service according to the present invention.

Referring to FIG. 4, a mobile terminal according to the present invention includes a transceiver 3 for receiving location information of pushto service subscribers and for performing a group communication function with each member of the group; a controller 2 for generating and outputting, based on the subscriber location information received via the transceiver, a control signal for displaying (outputting) group member list information, which includes member location information, relative to a specific area according to a user request command, which may be input via a keypad 1; and a display 4 for displaying a list of the group members with respect to the specific area according to the control signal of the controller. The display 4 may be embodied as any user interface means having a visual, aural, or other sensory output for informing the mobile terminal operator (user) of the group member list information. The keypad 1 may be embodied as means for an automatic entry of a group communication request for performing a specific group communication function according to a program stored in the controller 2.

Accordingly, the present invention incorporates a location-based service to a conventional pushto service, so that a mobile terminal can perform a pushto communication function with respect to an individual or group located relative to a specific area only, thereby enabling selective group communication functions with group communication counterparts according to a mobile terminal's location, namely, whether the counterpart terminal is located inside or outside the specific area. By enabling a display of a counterpart's specific area, a user's communication efficiency is enhanced so that communication may be specifically directed accordingly, which also conserves radio resources by enabling a reduction in unnecessary communications. As a practical application, a group communication function of the pushto service (the unidirectional voice communication) can be used by a taxicab company, delivery services, or among specifically established groups such as a social club, a private family, or clients working or congregating in one or more definable areas.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method of performing a group communication service with respect to a plurality of pushto service subscribers using terminal location information in a mobile terminal, the method comprising:
   acquiring location information of each of the plurality of pushto service subscribers, the location information indicating a current location of at least one of the plurality of pushto service subscribers;
   receiving a user selection command for generating a group member list, the user selection command comprising selection of one subscriber among the plurality of pushto service subscribers to designate a specific area with reference to a location of the selected one subscriber, the one subscriber being a subscriber other than a user of the mobile terminal;
   generating the group member list based upon the specific area;
   displaying the group member list comprising group members relative to the specific area and current status information of each of the group members, the current status information comprising at least on line and off line status; and
   selectively communicating with at least one of the group members in the displayed group member list,
   wherein the specific area is defined by a predetermined distance from the location of the selected one subscriber.

2. The method of claim 1, further comprising:
   initiating a group communication request for performing a specific group communication function with respect to the at least one of the group members in the displayed group member list; and
   performing the specific group communication function in response to the group communication request.

3. The method of claim 1, wherein the group member list comprises the at least one of the plurality of pushto service subscribers that are determined to be inside the specific area according to the location information.

4. The method of claim 1, wherein the location information is provided through at least one of a presence service providing a location-based service or a global positioning service.

5. The method of claim 1, wherein each of the plurality of pushto service subscribers operates a mobile terminal provided with the location information and a group communication request is initiated by one of the plurality of pushto service subscribers.

6. The method of claim 5, wherein the one of the plurality of pushto service subscribers operates as an inviter terminal or a master terminal.

7. The method of claim 6, wherein the master terminal has authority to establish group communication.

8. The method of claim 6, wherein the one of the group members is the master terminal.

9. The method of claim 6, wherein the one of the group members is the inviter terminal.

10. The method of claim 1, wherein the predetermined distance is determined by one of the user, the mobile terminal, or a mobile communications system of the mobile terminal.

11. The method of claim 1, wherein the group member list is periodically updated by refreshing the terminal location information.

12. The method of claim 1, wherein the group member list is sorted according to a relation to the user.

13. The method of claim 1, wherein the group communication service provides at least voice, text, or image data transmission service.

14. A mobile terminal, comprising:
   a transceiver for receiving location information of a plurality of pushto service subscribers, the location information indicating a current location of at least one of the plurality of pushto service subscribers, and for performing a selective group communication function with respect to each of the plurality of pushto service subscribers;
   a user input unit for receiving a user selection command for generating a group member list, the user selection command comprising selection of one subscriber among the plurality of pushto service subscribers to designate a specific area with reference to a location of the selected one subscriber, the one subscriber being a subscriber other than a user of the mobile terminal;
   a controller for generating and outputting the group member list based upon the specific area; and
   a display for displaying the group member list comprising group members relative to the specific area and current status information of each of the group members under control of the controller, wherein the current status information comprises at least on line and off line status,
   wherein the mobile terminal is configured to selectively communicate with at least one of the group members in the displayed group member list, and
   wherein the specific area is defined by a predetermined distance from the location of the selected one subscriber.

15. The mobile terminal of claim 14, wherein the group member list is sorted according to a relation to the user.

16. A group communication service system utilizing a location based service function, the group communication service system comprising:
   a location information provider for determining locations of each of a plurality of mobile terminals and for registering a plurality of service subscribers; and a terminal for:
performing a selective group communication function according to a user selection command designating a specific area by continuously exchanging status information with a network and updating location information of at least one of the plurality of service subscribers, the user selection command comprising selection of one subscriber among the plurality of service subscribers to designate a specific area with reference to a location of the selected one subscriber, the one subscriber being a subscriber other than a user of the mobile terminal, generating a group member list based upon the specific area; and displaying the group member list including group members relative to the specific area, the user selection command designating whether the group members are inside the specific area, and current status information of each of the group members, the current status information comprising at least on line and off line status, wherein the terminal is configured to selectively communicate with at least one of the group members in the displayed group member list, and wherein the specific area is defined by a predetermined distance from the location of the selected one subscriber.

17. The group communication service system of claim 16, wherein the location of any one of the plurality of mobile terminals is determined by at least one of a mobile communication network or a satellite signal.

18. The group communication service system of claim 16, wherein the user selection command is selected from a menu comprising:
grouping the group members according to a specific area;
sorting the group members according to a specific area;
grouping the group members according to a specific area defined by the user;
grouping the group members according to a specific area determined with respect to the one of the group members selected by the user; and
grouping the group members according to a specific area determined with respect to the user.

19. The group communication service system of claim 16, wherein the predetermined distance is set by the user.

20. The group communication service system of claim 16, wherein the predetermined distance is predefined by the system or the terminal.

21. The group communication service system of claim 18, wherein the menu is displayed in a pop-up menu form.

22. The method of claim 1, further comprising:
displaying a name of the specific area with the group member list.

23. The method of claim 1, wherein the user selection command is selected from a menu comprising:
grouping the group members according to a specific area;
sorting the group members according to a specific area;
grouping the group members according to a specific area defined by the user;
grouping the group members according to a specific area determined with respect to the one of the group members selected by the user; and
grouping the group members according to a specific area determined with respect to the user.

24. The mobile terminal of claim 14, wherein the user selection command is selected from a menu comprising:
grouping the group members according to a specific area;
sorting the group members according to a specific area;
grouping the group members according to a specific area defined by the user;
grouping the group members according to a specific area determined with respect to the one of the group members selected by the user; and
grouping the group members according to a specific area determined with respect to the user.

25. A method of performing a group communication service with respect to a plurality of group communication service subscribers using terminal location information in a mobile terminal, the method comprising:
acquiring location information of each of the plurality of group communication service subscribers, the location information indicating a current location of at least one of the plurality of group communication service subscribers;
receiving a user selection command, the user selection command comprising selection of one subscriber among the plurality of group communication service subscribers to designate a specific area with reference to a location of the selected one subscriber, the one subscriber being a subscriber other than a user of the mobile terminal;
generating group member list based upon the specific area;
displaying the group member list comprising group members relative to the specific area and current status information of each of the group members, the current status information comprising at least on line and off line status; and
selectively communicating with at least one of the group members in the displayed group member list,
wherein the specific area is defined by a predetermined distance from the location of the selected one subscriber.

26. The method of claim 10, wherein the predetermined distance is preset by the mobile terminal.

27. The method of claim 10, wherein the predetermined distance is set by the user.

28. The method of claim 25, further comprising displaying a name of the specific area with the list of group members.

29. The method of claim 25, wherein the predetermined distance is set by the user.

30. A method of performing a group communication service with a plurality of service subscribers using terminal location information in a mobile terminal, the method comprising:
displaying a contact list;
receiving an input for selecting a target member in the contact list;
acquiring location information of the selected target member, the location information indicating a current location of the target member;
displaying the location information of the target member;
defining a specific area with respect to the target member;
grouping the plurality of service subscribers according to the defined specific area;
generating a group member list including the grouped plurality of service subscribers as group members;
displaying the group member list with a current location of each of the group members classified with respect to the specific area and current status information of each of the group members; and
selectively communicating with at least one of the group members in the displayed group member list,
wherein the specific area is defined by a predetermined distance from the current location of the target member.

31. The method of claim 30, wherein the predetermined distance is set by a user.

32. The method of claim 30, wherein the predetermined distance is set by the mobile terminal.

33. The method of claim 30, wherein the predetermined distance is set by a mobile communication system.

* * * * *